Figures 1, 2:
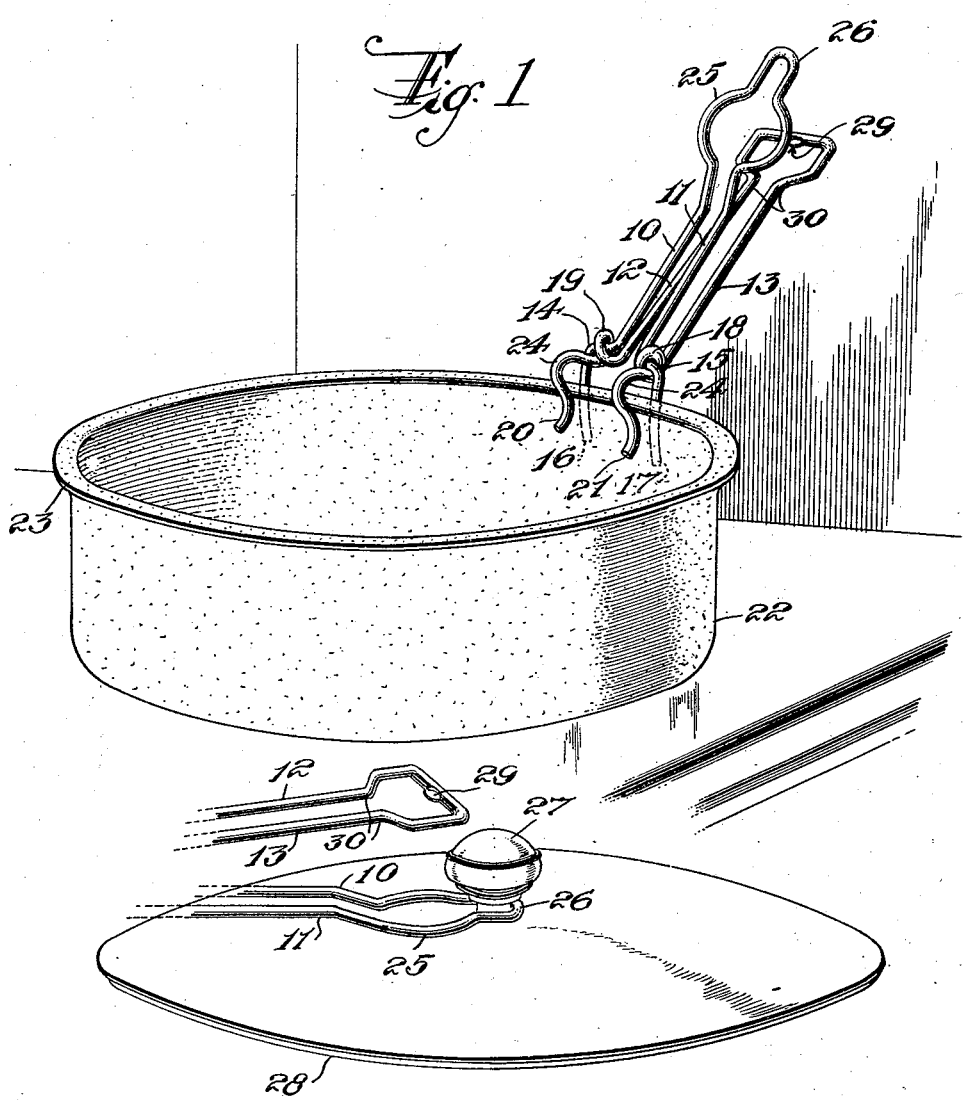

Oct. 8, 1929.  C. E. ANDERSON  1,730,444
KITCHEN TOOL
Filed Feb. 11, 1926

INVENTOR.
Carl E. Anderson,
BY
ATTORNEY.

Patented Oct. 8, 1929

1,730,444

UNITED STATES PATENT OFFICE

CARL E. ANDERSON, OF NEWARK, NEW JERSEY, ASSIGNOR TO EASTERN TOOL & MFG. COMPANY, OF BLOOMFIELD, NEW JERSEY

KITCHEN TOOL

Application filed February 11, 1926. Serial No. 87,494.

The present invention relates to an improved kitchen utensil which can be used for lifting pots and pans so as to avoid the burning of fingers and can also be used for horizontal members such as pie plates and the like. The utensil is designated and can also be used for the lifting of the lids from hot pots and pans by reason of the utensil being adapted to receive and support the knob of a lid and also combines at the end of one of the handles a structure that is usable as a bottle opener.

The invention is illustrated in the accompanying drawing in which Figure 1 is a perspective view of the improved tool in position on a pan and Figure 2 is a perspective view showing how the end of one handle is used for supporting a lid.

The utensil consists of two members, each member being made of a return wire, one member comprising a return wire forming the strands 10 and 11, the other member being formed of the return wire having the strands 12 and 13. These members are hinged near one end to form relatively short jaws and long handles.

The hinging can be done in any desired way but is usually done by extending the wires 10 and 11 to form transverse short lengths 14 and 15 which terminate in the jaws 16 and 17, and around the arms 14 and 15 I form the knuckles or loops 18 and 19 which are then extended to form the jaws 20 and 21.

It will thus be evident that when the handles are pressed together by grasping them in the hand, the jaws are also pressed together and can thus be used to raise and to hold pot utensils as will be seen from Figure 1 in which the utensil 22 is shown as being in the grasp of the tool.

Most pots or pans have a flange 23 or a beaded edge which forms substantially a flange and in order to allow room for this flange the jaws of one member are provided with a hump as at 24, thus allowing sufficient clearance between the jaws when their extremities are in contact or nearly so and the converging part of the jaws thus assists in holding the utensil by its flange in addition to the friction at the ends of the jaws.

It will be evident that in using the jaws horizontally instead of vertically, they can be made to grasp a hot plate or pan of shallow form such as a pie plate.

One of the handles is provided with an enlarged part near its end by bending the wire out as shown at 25 to form an enlargement so that this enlarged portion can be fitted over the knob 27 of the lid 28 and then the utensil is pulled until the shank of the knob is in the return bend 26 and the lid can then be lifted. This will be evident from Figure 2.

The other handle is provided at its return bend and on the inner edge thereof with a flattened portion 29 which forms part of a bottle opener providing that part that goes under the crimped edge of the usual metallic seal and the part 30 of the handle opposite thereto is used as the fulcrum which rests on the centre of the seal or near the other edge thereof.

It will be evident from the drawing that the outer ends of the handle can not be brought together at the ends as the part 25 is offset from the plane of the strands 10 and 11. This enables the parts to be grasped to be used as a lid lifter and insure the clearance necessary to allow the knob 27 to be received in the enlarged part 25 and also in the return bend 26 without interference by the other arm of the handle.

I claim :—

A kitchen tool comprising members hinged together near one end to form short jaws and long handles, one of said handles being bent into an offset portion to insure the separation of said handles at the ends when the jaws are closed, said off-set end being provided with a key-hole slot to receive the knob of a lid.

In testimony whereof I affix my signature.

CARL E. ANDERSON.